J. P. MARTIN.
Car Brake.

No. 9,116.

2 Sheets—Sheet 1.

Patented July 13, 1852.

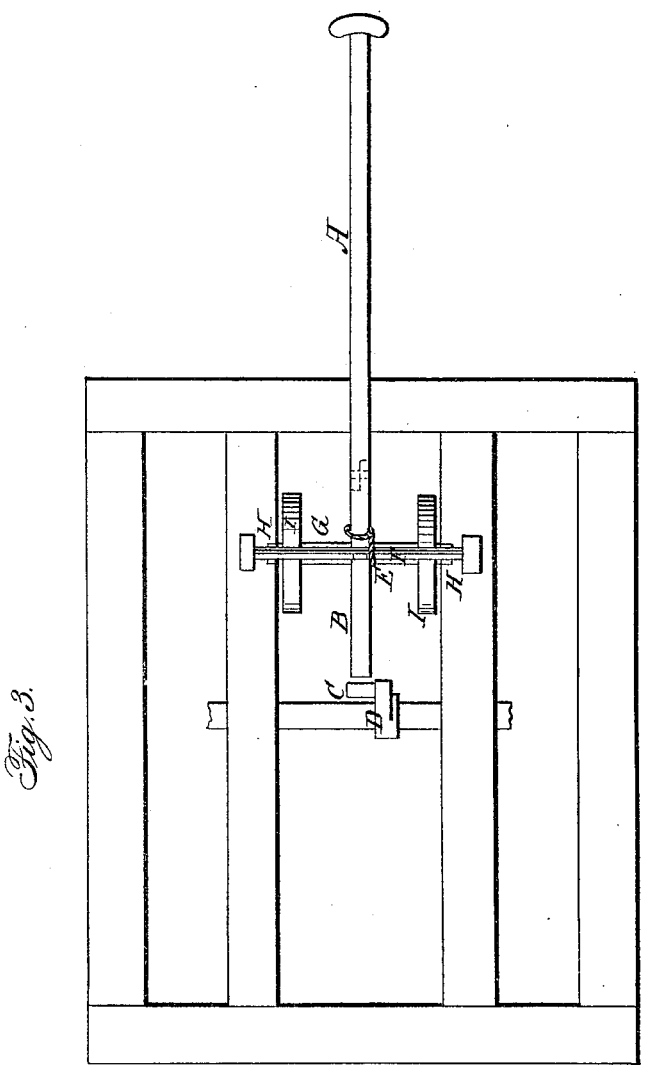

UNITED STATES PATENT OFFICE.

JOSEPH P. MARTIN, OF PHILADELPHIA, PENNSYLVANIA.

RAILROAD-CAR BRAKE.

Specification of Letters Patent No. 9,116, dated July 13, 1852.

*To all whom it may concern:*

Be it known that I, JOSEPH P. MARTIN, of the city and county of Philadelphia and State of Pennsylvania, have invented a new and useful Improvement in Self-Acting and Self-Detaching Railroad-Car Brakes, which is described as follows, reference being had to the annexed drawings of the same, making part of this specification.

Figure 1:
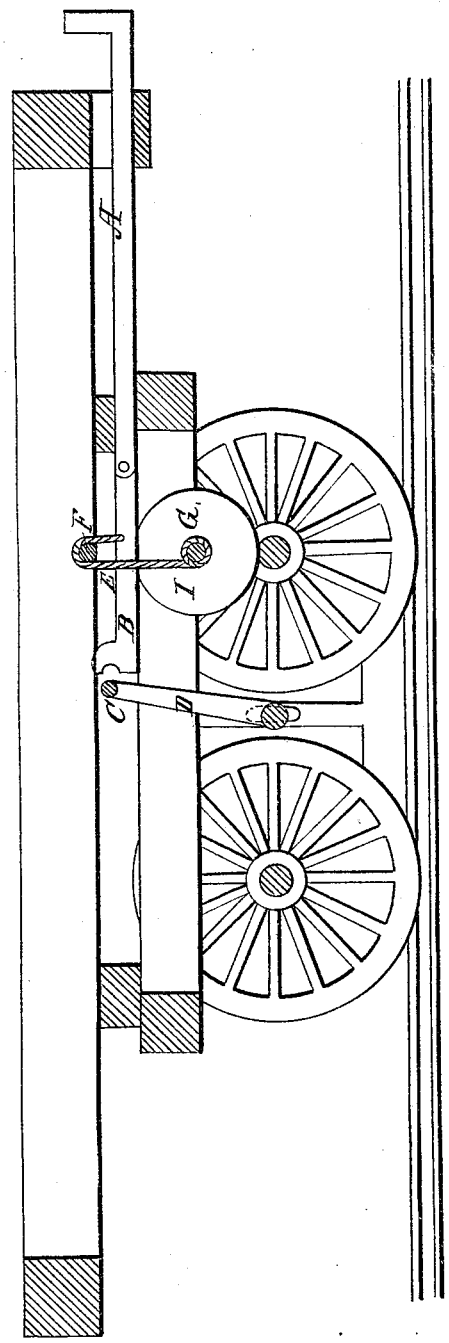
Figure 2:
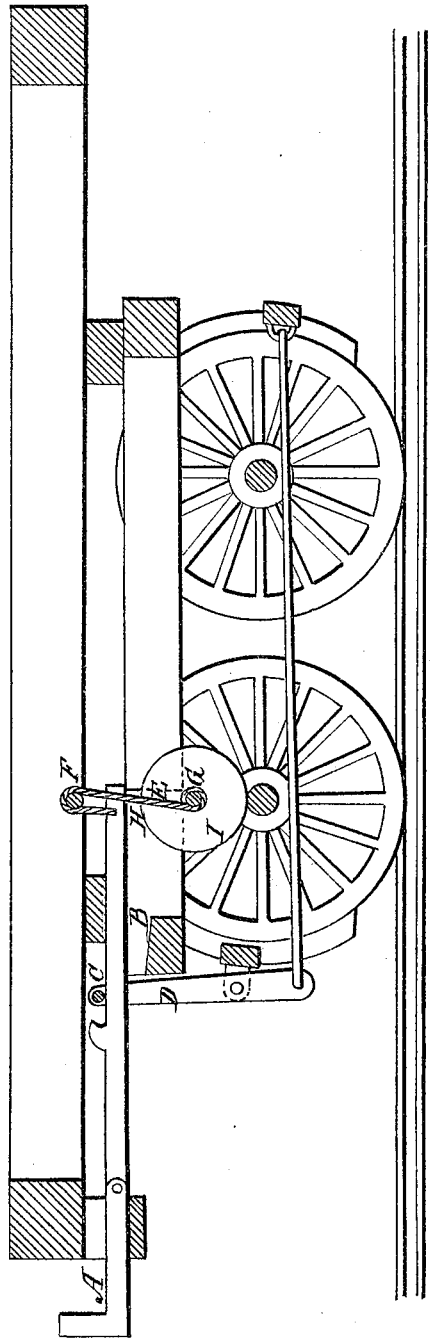

Figure 1, is a side elevation of a four wheel car having the brake rubbers between the wheels, and the improvement attached. Fig. 2, is a side elevation of a similar car with rubbers behind and before the wheels. Fig. 3 is a top or birds eye view of the truck of a four wheel car with the improvement attached.

Similar letters in the figures refer to like parts.

The nature of this invention consists in operating on the upper ends of the levers, which move the rubbers of railroad car brakes, by longitudinal jointed bars, moving in guides at the will of the engineer when the train is in forward motion, and projecting beyond either end of the car; the inner one of said bars being held in a suspended state by means of a chain passing over a roller above the same, and around the shaft of friction wheels resting on the shaft of the wheels of the car in such a manner as to enable the inner end of said inner bar to descend and clear itself of contact with the rubber levers after the train has been checked in order to back the same, and to be raised to its former position for acting, after the train has been moved a certain distance ahead.

To enable others skilled in the art to make and use my invention, I will proceed to describe its construction and operation.

The outer sliding bar A may be either arranged immediately below the car frame, or within the same, midway between its sides, and projects a sufficient distance beyond the end of the frame (being turned upward or provided with an upright bumper at this end to receive the pressure of the next car) when not acted on to give the rubbers the required pressure on the wheels, when its turned up or bumper end is pressed against the frame. It may be held out when no pressure is exerted on it by a spiral elliptic or other formed spring, arranged between its turned up or bumper end and the frame or truck of the car, which spring should be of sufficient elasticity or strength to throw and keep it out upon all occasions when not obstructed by the frame or bumper of the next car. This bar A is guided horizontally by suitable guides which may be secured to either the frame or truck, in a four wheel car, but must be secured to the truck in an eight wheel car in order to keep the bar always at right angles with the end of the truck. The inner bar B is secured firmly at its end to the bar A by a bolt, upon which it has an up and down movement, and is forked at its opposite end, and formed somewhat similar to the cam hook of a steam engine so as to receive a pin C projecting from the upper end of the rubber levers D, and is held in a horizontal position, slightly in advance of the pin C by a chain E which passes over a horizontal transverse roller F, turning in ears secured to the truck, and is secured to and wound around a similar shaft G inserted in slots H or upright guides formed in or secured to the truck, and arranged parallel below the same, having two friction wheels I secured near its extremities, which rest on the shaft of the car wheels, and are of sufficient weight to afford the required degree of friction, between their bearing surfaces, and the periphery of the car wheel shaft, to raise and keep the inner bar B, in a horizontal position, when the train moves forward.

The manner in which the rubbers are acted upon to stop the train, and the method of preventing the jointed bar B, from acting on the rubber levers when it is desired to back the train are as follows: Supposing the train to be in motion, and it is desired to stop the same. The engineer decreases the speed of the locomotive, in a commensurate degree with the space in which the train is to be stopped, which brings successively the turned up or bumper ends of the sliding bars A in contact with each other, and with the frames of cars (in case there are any in the train not having this appliance attached) which forces them toward their respective frames, and causes the forked or cam hook ends of the jointed bars B, to force against the pins C, and the rubbers to be pressed against the wheels, and the train to be stopped. As the forked bar B, moves it will draw the chain E with it, and unwind it from the shaft G of the friction wheels I—they being partially raised from the car wheel axle, by the movement, to relieve the friction between their surfaces and the car wheel axle, and enabled to move freely over the same. Should it then be desired to back the train, the engineer first starts the train forward, a sufficient distance to enable the turned up, or bumper end of the bars A, to be cleared of each other, and thrown outward from their respective frames, to their original positions, and the forked or cam hook ends of the bars B to clear themselves of the pins C, of the rubber levers D—which latter bars B, descend and remain suspended by the chains E in an inclined position. The train is then backed—the turned up or bumper ends of the bars A being forced against the frames of the cars to which they are attached, while the forked or cam hook ends of the jointed bars B pass under the pins C of the rubber levers D without of course acting on them. When the train is again started forward, the friction pulleys I are turned by the friction existing between them and the car wheel shaft upon which they rest, and the chain E is again wound on the shaft G of said pulleys, and the jointed bar B again brought to a horizontal position ready for action on the pins C as before—the relative sizes of the car wheel axle, and friction pulleys and shaft, being such as to require the train to move from twenty to thirty feet ahead, before this is accomplished.

It will be perceived from the foregoing, that it makes no difference at what part of the train a car, provided with the plan of brakes above described, is situated, or whether the cars preceding and succeeding it in the train, have similar appliances or not, it will receive the force of the momentum of all the cars behind it, and transfer that force to the rubber levers. Instead of employing the spring to force the sliding bars out, they may be attached to the drag chains, or couplings, in which case they will be drawn out by them at the proper time—namely when the train is moved forward, after being checked. The force of the shock consequent upon stopping the cars quickly, by this means, may be materially lessened, by the employment of the springs used in other brakes, deriving their power from the same source.

What I claim as new and desire to secure by Letters Patent, is—

The method of raising the forked or cam hook end of the jointed bar B, to a horizontal position, immediately in advance of the pin C at the upper end of the rubber levers D, so that it will act upon the same when forced back, and enabling it to detach itself and descend to an inclined position, when it is desired to back the train, by means of the friction wheels I, whose shaft G moves in slots, and whose peripheries rest on the car wheel shaft or axle, and chain E, attached to the shaft of the friction wheels, and passing over the roller F, above the jointed bar, to which it is attached, arranged and operated as herein described— whether said jointed bar B be attached to the sliding bar represented, or to the ordinary bumper of the car.

JOS. P. MARTIN.

Witnesses:
GEO. W. VON DUZEE,
C. J. McQUAIDE.